Oct. 26, 1965 N. R. BROWNYER 3,213,700
GEAR DRIVES
Filed May 6, 1963 2 Sheets-Sheet 1
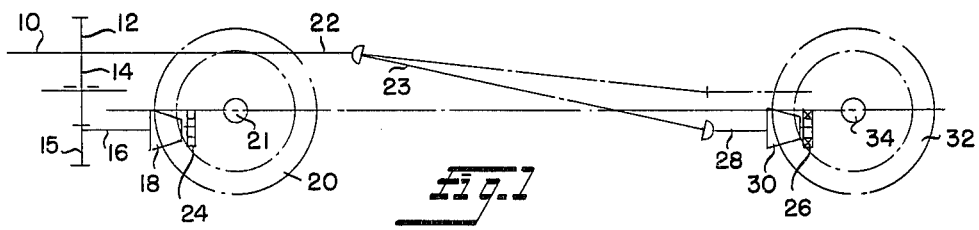
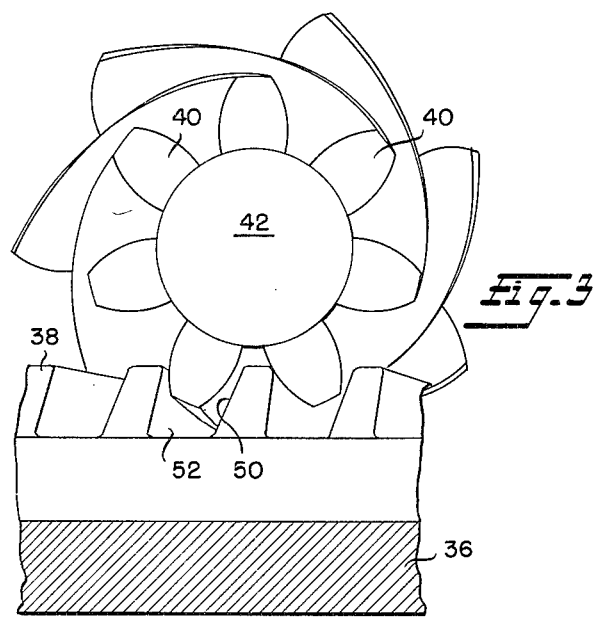
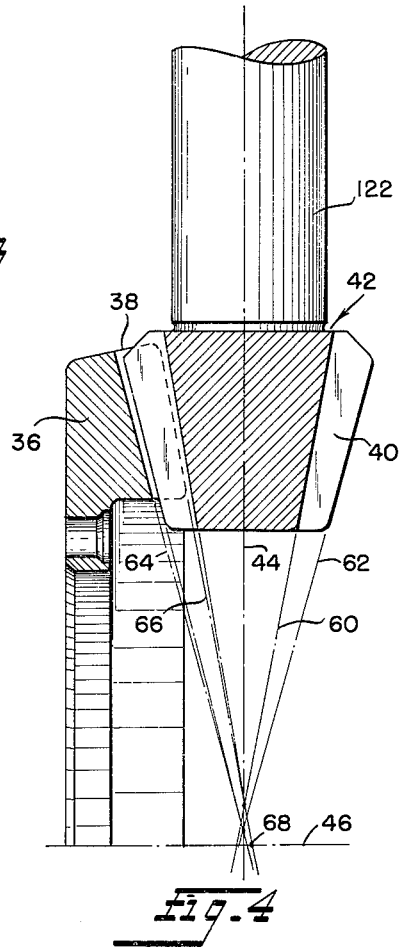
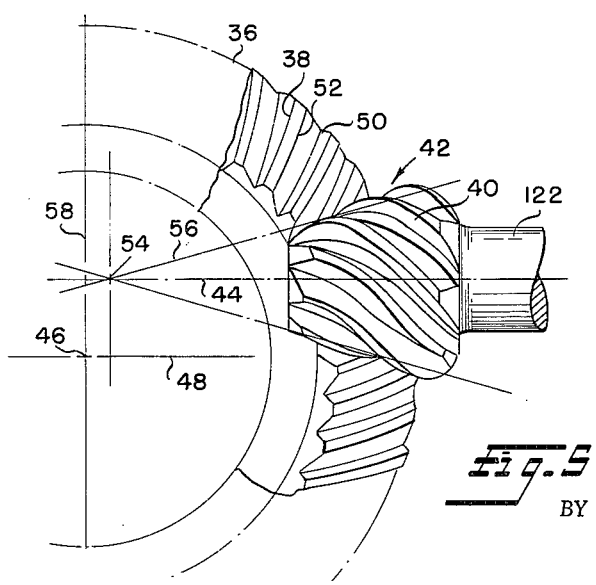
INVENTOR
*Nelson R. Brownyer*
BY
ATTORNEYS

United States Patent Office 3,213,700
Patented Oct. 26, 1965

3,213,700
GEAR DRIVES
Nelson R. Brownyer, Birmingham, Mich., assignor, by mesne assignments, to Rockwell-Standard Corporation, a corporation of Delaware
Filed May 6, 1963, Ser. No. 278,242
3 Claims. (Cl. 74—424)

The present invention relates to improvements in gear drives and final drive carriers incorporating bevel gearing. More particularly it relates to such drives and carriers embodying a novel combination of offset curved tooth bevel gears and supporting mountings.

Typical curved tooth gear sets, commonly called spiral bevel gear sets, are employed in many intermediate gear boxes and carriers of various types including final drives of automotive vehicles, lift trucks and other vehicles. In ordinary spiral gear sets, the pinion axis is located in the plane of the ring gear center axis, and in hypoid gear sets the pinion axis is usually offset above or below the center axis of the ring gear to increase tooth contact area and load capacity.

The ring gear of such gear sets in automotive drives is usually attached to the differential case of a single reduction automotive type axle or to a cross shaft of a double reduction axle, and is driven by the pinion which receives driving power from a prime mover via a transmission and drive shaft.

The convex side of the teeth on curved teeth bevel gears is normally termed the "drive side" on which the gear is driven in the normal direction of rotation and is capable of carrying the designated load due to its design. The opposite concave side of the teeth is termed the "coast side," and is the side on which the gear is driven in reverse direction of rotation. In prior hypoid gear sets the coast side has considerably reduced load capacity resulting from the inability of the bearings to hold the components in position caused by high driving thrust and radial load forces. Such hypoid gear sets therefore cannot operate equally well in forward and reverse rotation. For example, in the usual automotive final drive hypoid gear sets, the driving life of the coast side of the teeth is considerably less than the life of the drive side for equal loading, and the torque capacity of the coast side is therefore only about 75% of the torque capacity of the drive side for equal life. Such automotive final drives are commonly used in four wheel drive vehicles, for example, to drive the front and rear axle, or to drive two tandem drive rear axles of a multi-wheel vehicle with or without the front axle drive. In certain of such vehicle drives the hypoid gear sets can be arranged to avoid driving on the concave side of the gear teeth which has considerably less life expectancy than the convex side. This can be accomplished at great expense and inconvenience by reversing the carrier arrangement or re-designing the intermediate transfer equipment to provide the proper direction of rotation.

Prior straight tooth bevel gear sets on intersecting axes will operate equally well in either direction of rotation. However, this type of gearing has definite limitations in the automotive field and has been largely replaced by conventional spiral bevel or hypoid gear sets. For a spiral bevel gear set to operate at full capacity in reverse direction it is merely necessary to change to the opposite hand spiral angle without increasing the size of the gear. A hypoid gear set, however, unlike the spiral bevel gearing, cannot be modified for reverse rotation by change of spiral angle to the opposite hand. The entire hypoid set and its carrier must be re-designed to move the pinion to the opposite side of the ring gear center line. Even so, the re-designed gear carrier if compelled to operate a portion of the time on the coast side of the teeth (as in reverse operation) will still suffer the approximately 25% loss of load capacity during such operation.

As a result of the differing performance characteristics of the driving and coast sides of the teeth of the hypoid bevel and spiral bevel gear sets in general use, the life of such gearing is reduced materially while operating on the coast side by failure of the spigot, spigot bearing or spigot bearing support and serious wear of the gearing develops in numerous automotive services. For example, such failures occur in services that require substantial driving on the coast side of the teeth, as during coast braking down hill in gear; frequent start-stop delivery truck driving; frequent reverse driving under load as in lift trucks; front axle drive; axles used with retarders; front end loaders, etc.

Conventional hypoid gears for unidirectional rotation usually have a pinion spiral angle of between 45° and 50° as recommended by gear manufacturers. As used herein the term "spiral angle" refers to the angle between a tangent to a tooth spiral at any point and the pitch surface generator passing through that point. I have discovered that by considerably reducing this spiral angle to from 33° to 37° it is possible to provide a gear set which can drive at rated capacity with equal life in either direction of rotation. Although this gear set has slightly less load capacity when driving on the normal "drive side" of the teeth than a conventional unidirectional gear of comparable size it will have a considerably larger capacity when driving on the "coast side." The lesser capacity on the "drive side" of the teeth can be compensated for use in equipment by slightly enlarging the ring gear, but to a far lesser extent than would be normally required on conventional hypoid gears when it is found necessary to drive on the "coast side" of the teeth.

Other substantial advantages are attained by the present invention which will be apparent to those skilled in the power transmission art. By way of example my use of improved offset curved tooth bevel gears reduces thrust loads and separating forces of the gear set substantially below those of comparable hypoid gears, permitting the use of smaller and less costly bearings, and will allow carrier deflections substantially above the currently approved limits resulting in unexpected and surprising increase in life of the drive mechanism.

By reverting to the overhung type of pinion mounting the spigot bearing at the front end of the pinion, with its support in the carrier housing, may be omitted resulting in a cost reduction and permitting a gear face width of 30% of the cone distance of the gear set, compared to 21% to 27% of the cone distance in conventional straddle mounted hypoid gears.

In conventional hypoid gearing operating on both sides of the teeth and having the same capacity, number of teeth and size as a typical embodiment of my invention, considerably larger bearings and a stronger, larger, heavier and more costly carrier is required to withstand the larger hypoid gearing radial and thrust loads. Aside from the larger parts to be used and increased manufacturing costs involved it is well known that the bearings and the carrier for the gear set for any particular application are subject, as in all engineering designs, to certain structural limitations which must be observed so that increasing the size of the carrier or gear box and the size of the bearings to absorb the increased thrust and radial loads when driving on the "coast side" of the teeth is not sound design practice and in addition results in unreasonable cost and weight penalties in highly competitive automotive equipment. In most existing commercial vehicle installations to which my present discovery and invention are applicable it is not possible to substantially enlarge the carrier or the bearings because of presently imposed space and weight limitations. Therefore, to obtain the capacity of my improved gearing by the use of conventional hypoid gears, more costly components and carriers or gear boxes must be used.

Prolonged comparative tests have proved that my improved carrier and gearing, subjected to deflections the same as or larger than a conventional hypoid carrier during running of the mechanism, has a substantially greater unexpected overall life than the comparable conventional hypoid gearing designs. Furthermore, the present invention permits a relatively flexible mounting of the carrier and gear assembly as opposed to the considerably more rigid mounting in a conventional carrier employing a spigot bearing mount.

In addition, in conventional hypoid gearing it is well known that increasing the amount of offset within limits provides increased capacity in particular gear sets. However, in automobile running gear structures, and especially in tandem axle drives, it is not always possible to increase the pinion offset mainly because of the resulting excessive drive shaft universal joint angularity. Consequently, in such cases the gear sets must be re-designed for increased capacity to accomplish the same purpose.

Accordingly, it is a primary object of the present invention to provide offset curved teeth bevel gearing which will operate in forward, reverse or both directions of rotation with equally satisfactory results from the standpoint of efficiency, strength, scuff resistance and long life.

Still another object is the provision of drive assemblies embodying offset curved tooth bevel gears having spiral tooth angles substantially below conventional hypoid gear spiral angles in combination with carrier and component proportions to provide substantially increased balanced capacity and life for the drive and coast operations over equal size, comparable hypoid gear drive assemblies.

Additional objects and advantages of the present invention will become apparent as the description proceeds in connection with the accompanying drawings in which:

FIGURE 1 illustrates diagrammatically a typical prior tandem drive axle arrangement;

FIGURE 3 is an enlarged front view of the pinion and a section of the gear in mesh therewith;

FIGURE 4 is a cross section through the pinion and gear through their respective axes; and FIGURE 5 is a separate half view of the novel amboid gear and pinion set shown removed from the support structure.

Figure 2:
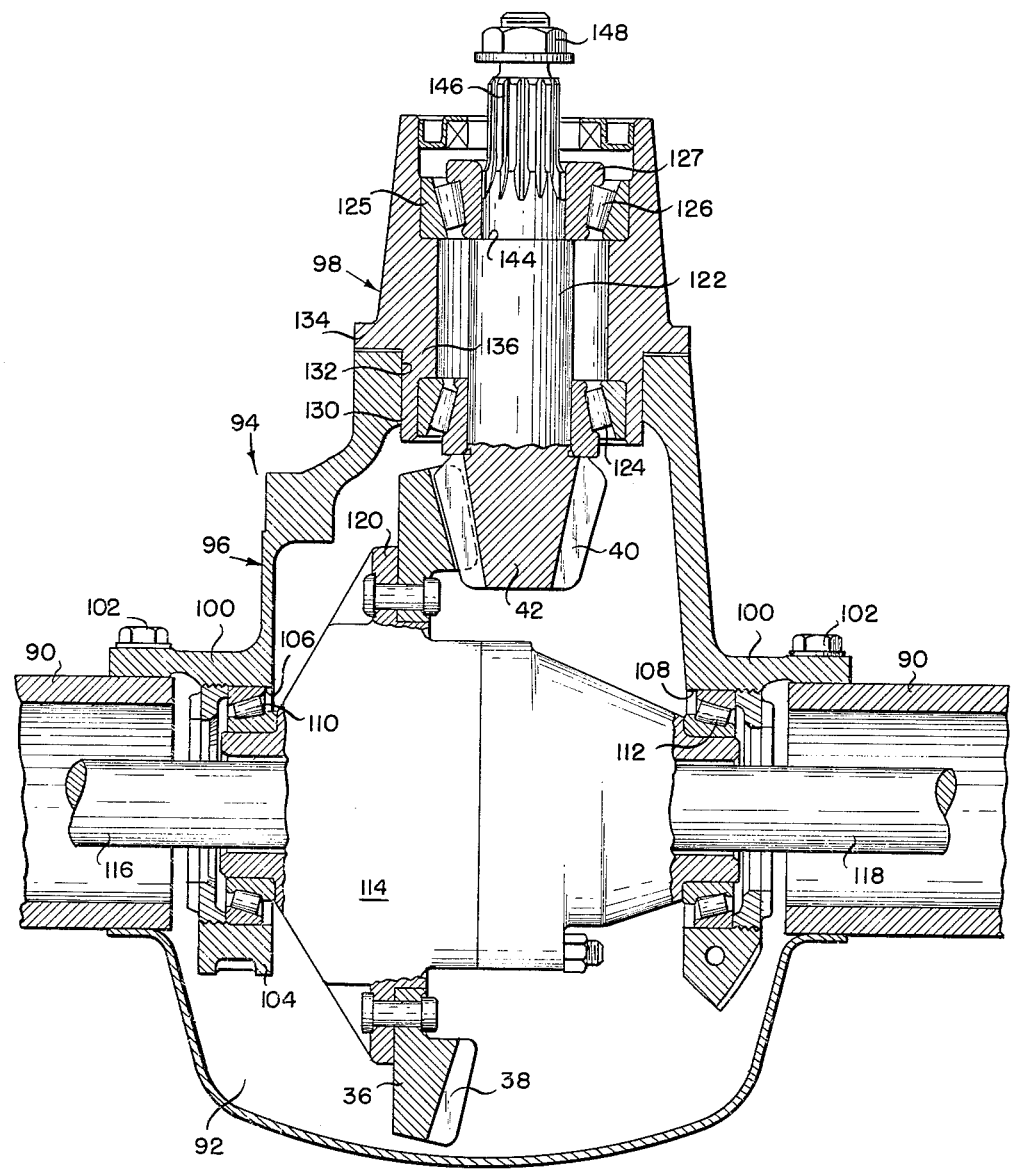
FIGURE 2 is a cross section through the novel carrier and gear assembly according to the present invention.

In a conventional tandem drive axle unit as shown in FIGURE 1 both axles are driven by a pair of conventional hypoid gear and pinion sets, the pinions being located below the centerline of the ring gear. During operation excessive noise is encountered which, it has been determined, is due to the acute universal joint angles at the intermediate drive shaft from the front rear axle to the rear rear axle because of the low position of the rear pinion in relation to the drive shaft. In other designs this excessive universal joint angle may be avoided by installing a drop box type idler gear set in front of the rear carrier but this cannot always be done due to space limitations and in addition would increase the cost and weight of the drive unit. If the pinion is positioned above the center of the ring gear and thereby driving on what is normally the "coast side" of the gear teeth the size of the gear must be substantially increased to compensate for reduced capacity and life expectancy. In other words, a ring gear of a given pitch diameter would have to be replaced by a substantially larger gear. This is also an obvious economic penalty which is highly undesirable.

The present invention solves these and other problems by providing a novel gear drive system which can be driven equally well on the "drive side" of the teeth as on the "coast side."

Referring now more specifically to FIGURE 1, numeral 10 designates the main propeller shaft of a motor vehicle drive line which drives a gear train including gear 12, idler gear 14, and gear 15 which is connected to a pinion shaft 16 having a pinion 18 which drives a ring gear 20. Pinion 18 and gear 20 constitute the driving members of a final drive assembly for a drive axle indicated at 21 which in this instance is the front axle of the illustrated rear tandem drive assembly. The first gear 12 is also connected to thru-drive shaft 22 which is universally coupled to an inter-axle propeller shaft 23 which leads to the rear and is universally connected at its other end to a pinion shaft 28 having a pinion 30 which drives a ring gear 32. Pinion 30 and ring gear 32 constitute the driving members of a final drive assembly for the rear axle 34 of the illustrated tandem drive assembly. The driving arrangement may be varied in many different ways; also speed reduction gearing and inter axle differentials may be incorporated which are not shown since they form no part of the present invention. Furthermore, the present invention is not limited to tandem drive axle assemblies but may also be utilized in single drive axles. However, the problem which the present invention solves may be best illustrated with reference to tandem drive axle applications as discussed above.

In most cases the front ends of the respective pinions 18 and 30 are journalled in spigot bearings schematically indicated at 24 and 26 respectively. These spigot bearings 24 and 26 are provided to add rigidity to the assembly and to counteract separating forces between the pinion and gear. These spigot bearings are usually supported in web formations integral with the inner walls of the carriers (not shown). Due to this conventional structure the space within the carrier is restricted so that the face width of the gears cannot appreciably be increased although this would be desirable in some instances. It has been found that with the present novel gearing the inner spigot bearing of the pinion may in many cases be disposed of because of the marked reduction in the separating forces.

As shown in FIGURE 1 the interaxle propeller shaft 23 assumes an undesirable angular position which creates excessive wear and noise at the universal joints. As explained before, in order to reduce the propeller shaft angle by positioning the pinion above the centerline of the gear as shown in broken lines in FIGURE 1, in a conventional construction the gear set as well as the carrier had to be re-designed and a larger gear installed. Aside from increased production costs this expedient destroys interchangeability and increases the difficulties in replacement part services. The novel gear drives herein disclosed eliminate the above disadvantages.

FIGURE 5 illustrates a portion of the gear drive of the present invention comprising a ring gear 36 having arcuate teeth 38 in mesh with the curved teeth 40 of a pinion 42. The pinion axis 44 does not intersect the axis 46 of the ring gear 36. When utilized in a system of the type shown in FIGURE 1 the pinion axis is offset above the horizontal centerline 48 of the gear 36.

In a conventional arrangement of such gearing the convex side 52 of the curved gear teeth 38 would be termed the "drive side" and the opposite concave side 50 of the teeth the "coast side," that is, the gear is rotated normally in clockwise direction. If the gear 36 were rotated in the opposite direction, the load should be reduced by about 25% in order to obtain equal life. This reduction in capacity is caused by reversal of thrust loads due to the intricate relationship between the spiral teeth of the pinion and gear as well as the inability of the carrier assembly to hold the gears in position. This relationship in spiral bevel gears is largely determined by the spiral angle of the pinion teeth, curvature of the gear teeth and location of the contact between the teeth and the obtained pressure angle. In conventional hypoid gearing the pinion spiral angle varies usually between 45° and 50° and the gear teeth angle between 30° and 40°.

Referring to FIGURE 5 it is apparent that the apex 54 of the pitch cone 56 of the pinion 42 in this particular instance lies in front of the vertical centerline 58 of the ring gear 36. However, other positions of the pinion apex as on or beyond the vertical centerline of the ring gear may be possible without influencing the characteristics of the present novel gear drive.

The general shape of the teeth 38 and 40 of the gear and pinion, respectively, may be conventional and may be produced on existing gear cutting machines. The novel gears of the present invention may be produced in accord with the following requirements: The relative angular position and curvatures of the pinion and gear teeth to provide the desired effect with which the present invention is concerned for any particular load application may be determined by proper proportioning of the gear pair such that the desired condition will be assured. This can be geometrically represented in a well known manner and under assumption of known factors such as the radius of tooth curvature, desired spiral angle, etc.

Thus, a preferred tooth profile with a reduced spiral angle for the present novel gear set can be developed in which the spiral angle for the pinion is preferably between 33° and 37° and for the gear between 18° and 37° thereby providing a gear set which has approximately equal load capacity in both directions of rotation and which develops materially reduced thrust and radial load forces. This is best demonstrated by comparison of test results of examples of a conventional hypoid gear set with two novel gear drives of the present invention with differing pinion offsets. The test results on the sets which were picked at random from various gear sets extensively tested over a prolonged time period are as follows:

|  | Conventional | Novel | |
| --- | --- | --- | --- |
| Pinion Offset | 1.75″ | 1.75″ | 2″ |
| Number of Teeth | 7–43 | 7–43 | 7–43 |
| Ratio | 6–1/7 | 6–1/7 | 6–1/7 |
| Gear Diameter | 16.875″ | 16.875″ | 16.875″ |
| Face Width | 2.12″ | 2.60″ | 2.60″ |
| Pinion Bearing Mounting | Straddle | Overhung | Overhung |
| Spiral Angle-Gear | 35° | 21°7′ | 19°5′ |
| Spiral Angle-Pinion | 48°24′ | 35° | 35° |
| Pinion Torque, Ft. Lb | 3,140 | 3,140 | 3,140 |
| Bending Stress | 39,221 | 38,600 | 37,764 |
| Pinion Cycles Before Failure | 162,220 | 182,060 | 213,414 |
| Compressive Stress | 330,354 | 332,084 | 328,247 |
| Thrust Load on the Pinion When Driving on the Drive Side (Load in Percent of Tangential Load) | 125.32 | 80.47 | 80.31 |
| Thrust Load on the Gear When Driving on the Drive Side | 30.52 | 31.54 | 30.89 |
| Radial Load on the Pinion When Driving on the Drive Side | 31.46 | 29.56 | 28.22 |
| Radial Load on the Gear When Driving on the Drive Side | 81.28 | 48.81 | 44.77 |
| Thrust Load on the Pinion When Driving on the Coast Side | −92.50 | −54.18 | −53.63 |
| Thrust Load on the Gear When Driving on the Coast Side | 66.86 | 54.04 | 53.45 |
| Radial Load on the Pinion When Driving on the Coast Side | 88.92 | 68.10 | 69.35 |
| Radial Load on the Gear When Driving on the Coast Side | −53.98 | −25.08 | −20.78 |

All three specimens are of the same size having the same number of teeth. Due to the straddle mount of the conventional hypoid gear the face width must be held smaller than in the novel gear set of the present invention in which the spigot bearing for the straddle mount may be eliminated due to reduced forces.

It also illustrates that a small increase of pinion offset in the novel gear drive further increases the life of the pinion. The spiral angle for both pinion and gear are considerably smaller than in the conventional gear set. Although the torque input is the same for all three gear sets, bending and compression stresses are appreciably lower in the gear sets of the subject invention and the cycle life for the pinions before failure is therefore much greater than that of the conventional pinion, and the thrust forces on the novel pinions on either drive or "coast side" of the teeth are considerably less than in the conventional pinion, and the radial forces on the novel gears on either drive or "coast side" of the teeth are appreciably reduced by comparison, thus making it possible to drive the novel gear sets in either clockwise or counterclockwise direction of rotation equally effectively.

In addition, the aforementioned tests revealed other important advantages over conventional hypoid gear sets of comparable size or capacity. It was mentioned earlier that an increased offset of the pinion from the centerline of the gear would be desirable in some instances to increase the capacity of the gear set which, however, could not always be done in the conventional hypoid gear sets. Theoretical studies indicated that an increased pinion offset further increased the capacity and decreased radial and thrust loads on either drive or "coast side" of the teeth. For example, it has been established that an increase in pinion offset of .25″ produces favorable reductions in both thrust and radial loads on either drive or coast side of the teeth.

This novel carrier and gear combination of the present invention is illustrated in FIGURE 2. The carrier shown in FIGURE 2, which incorporates the novel gear set illustrated in FIGURES 3 to 5, may be utilized in either the forward or rear axle of a tandem drive unit such as shown in FIGURE 1 or a front drive axle (not shown).

With further reference to FIGURE 2, a drive axle housing is illustrated at 90 having an apertured bowl section 92 into which is inserted a carrier 94. Carrier 94 comprises a main housing portion 96 and pinion carrying portion 98. The main housing portion 96 has a bell shaped form interrupted by a radial flange 100 with which the carrier is attached to the axle housing 90 by means of bolts 102. The lower part 104 of main housing portion 96 below the flange 100 extends into the bowl section 92 and is provided with transverse aligned apertures 106 and 108, respectively, which receive antifriction bearings 110 and 112 respectively to rotatably support a differential case 114. The differential mechanism (not shown) contained in the differential case 114 may be of any known conventional or other construction and does not form a part of the present invention. Axle shafts 116 and 118 extend in opposite directions from the differential case 114 through the axle housing 90 in a manner known per se. The differential case 114 has a flange 120 to which is attached the novel ring gear 36 which is in mesh with the associated pinion 42. The pinion 42 has a pinion shaft 122 which is journalled in antifriction bearings 124 and 126 supported in a separate pinion housing 98 attached to the front end of the carrier. Pinion housing 98 is provided with a recessed pilot section 130 which fits into a corresponding aperture 132 at the front end of the main housing portion 96. Radial flange 134 limits the inward extension of the pinion housing and provides means to attach the pinion housing to the main housing portion. The inner pinion bearing 124 is axially secured between the back face of the pinion 42 and an internal radial flange 136. The outer pinion bearing 126 is axially secured by the internal flange 136 and a shaft shoulder 144. By attachment of a conventional drive shaft or universal joint flange (not shown) to the splined end 146 of the pinion shaft 122 the outer bearing will be axially secured and the bearing loads may then be adjusted by means of the securing nut 148, at the end of the pinion shaft.

In the present embodiment of the light weight carrier and gear assembly as illustrated in FIGURE 2 the differential bearings 110 and 112 and the pinion bearings 124 and 126 for any particular application are considerably lighter than for a comparable conventional hypoid gear set even when the conventional spigot bearing usually provided at the inner end of the pinion shaft is eliminated.

The bearing load situation can best be illustrated by comparing the data in the following chart:

| Bearing Position | Hypoid (Rated Load) | | Present Invention |
|---|---|---|---|
| Right H. Differential | Radial | 8,350 | 7,800 |
| | Thrust | 6,300 | 6,000 |
| Left H. Differential | Radial | 9,700 | 7,800 |
| | Thrust | 8,800 | 6,000 |
| Pinion Front | Radial | 12,500 | 10,800 |
| | Thrust | 10,400 | 8,750 |
| Pinion Rear | Radial | 12,500 | 10,800 |
| | Thrust | 10,400 | 8,750 |

Thus, it can be seen that in a conventional hypoid gear arrangement of comparable capacity, heavier bearings with greater load ratings must be employed with a resulting increase in cost and weight in addition to a larger carrier.

It will be apparent from the foregoing description and by comparison of the foregoing test data that many important advantages are obtained by this novel gear drive system of which reduction in size of the pinion shaft bearings, omission of the spigot bearing and increased capacity for a given size and longer life are only a few. The present novel gear drive set made makes a variety of vehicle drive line applications possible not hitherto obtainable without redesign of the gear sets in applications where it would be more desirable and convenient to "drive" on the "coast side" of the teeth.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hypoid gear drive assembly comprising a housing, a ring gear, means supporting said ring gear in said housing for rotation about a predetermined axis, a pinion gear, means supporting said pinion gear for rotation about an axis substantially normal to the axis of said ring gear and in driving relation therewith, the axis of said pinion gear being offset from the axis of said ring gear, said pinion gear and said ring gear each having spiral teeth in engagement substantially along their entire length, the teeth of said pinion gear having a spiral angle between 33° and 37° and the teeth of said ring gear having a spiral angle between 18° and 37° to permit said pinion gear to drive said ring gear effectively in either direction of rotation.

2. A hypoid gear assembly comprising a first housing adapted to receive a differential mechanism for rotation therein, a ring gear attached to said differential mechanism, said housing having an aperture at one end thereof, a second tubular housing piloted in said aperture adapted to rotatably support a pinion shaft, a pinion gear on said pinion shaft extending into said first housing and meshing with said ring gear, the axis of said pinion gear being offset from the axis of said ring gear, said pinion gear having spiral teeth, the spiral angle of which is not more than 37°, and said ring gear having spiral teeth, the angle of which is not more than 37° nor less than 18°.

3. A hypoid gear drive assembly for a vehicle comprising a main housing having an opening at one end and coaxial openings at its opposite sides, a gear carrier rotatably supported in said side openings for rotation about an axis substantially normal to the axis of said end housing opening, a ring gear carried by said carrier, a second housing detachably secured to said main housing, said second housing having a pilot portion extending through and supported by the surface of said end housing opening, a pinion having a shaft extending from one side only thereof, bearing assemblies carried by said second housing rotatably supporting said pinion shaft to dispose said pinion gear in driving engagement with said ring gear with the axis of said pinion gear offset from the axis of said ring gear, the teeth of said pinion gear having a spiral angle between 33° and 37° and the teeth of said ring gear having a spiral angle between 18° and 37°.

References Cited by the Examiner
UNITED STATES PATENTS

| 1,455,706 | 5/23 | Bower et al. | 74—459.5 |
| 1,814,911 | 7/31 | Fickett | 74—459.5 |
| 2,015,969 | 10/35 | Schildknecht | 74—607 |
| 2,183,667 | 12/39 | Beckendale | 74—713 |
| 2,445,559 | 7/48 | Boor | 74—459.5 |
| 2,548,258 | 4/51 | Griffith | 74—713 |

DON A. WAITE, *Primary Examiner.*